US008503670B2

United States Patent
Leech (10) Patent No.: US 8,503,670 B2
(45) Date of Patent: *Aug. 6, 2013

(54) PARALLELIZABLE INTEGRITY-AWARE ENCRYPTION TECHNIQUE

(75) Inventor: Marcus Leech, Smith Falls (CA)

(73) Assignee: Rockstar Consortium US LP, Plano, TX (US)

(*) Notice: Subject to any disclaimer, the term of this patent is extended or adjusted under 35 U.S.C. 154(b) by 355 days.

This patent is subject to a terminal disclaimer.

(21) Appl. No.: 12/750,086

(22) Filed: Mar. 30, 2010

(65) Prior Publication Data

US 2010/0183146 A1    Jul. 22, 2010

Related U.S. Application Data

(62) Division of application No. 10/772,433, filed on Feb. 6, 2004, now Pat. No. 7,697,681.

(51) Int. Cl.
*G06F 21/00* (2006.01)

(52) U.S. Cl.
USPC .................................. 380/28; 380/29; 380/37

(58) Field of Classification Search
None
See application file for complete search history.

(56) References Cited

U.S. PATENT DOCUMENTS

| 7,093,126 B1 | 8/2006 | Jutla |
| 2001/0033656 A1 | 10/2001 | Gligor et al. |
| 2001/0046292 A1 | 11/2001 | Gligor et al. |
| 2002/0048364 A1 | 4/2002 | Gligor et al. |
| 2002/0051537 A1 | 5/2002 | Rogaway |
| 2003/0152219 A1 | 8/2003 | Coppersmith et al. |

OTHER PUBLICATIONS

Donescu, P. el al., "A Note on NSA's Dual Counter Mode of Encryption," Aug. 5, 2001.
Gligor, V. et al., "Fast Encryption and Authentication: XCBC Encryption and XECB Authentication Modes," Aug. 18, 2000.
Kilian, J., How to Protect DES Against Exhaustive Key Search (An Analysis of DESX), University of California at Davis, Department of Computer Science, pp. 1-16, Feb. 1996.
Rogaway, P. et al., "OCB: A Block-Cipher Mode of Operation for Efficient Authenticated Encryption," Sep. 19, 2001.
Schneier, B., Applied Cryptography, John Wiley & Sons, Inc., Second Edition, pp. 45, 275, and 367 (1996).

*Primary Examiner* — Benjamin Lanier
(74) *Attorney, Agent, or Firm* — Christopher & Weisberg, P.A.

(57) ABSTRACT

The present disclosure provides a parallelizable integrity-aware encryption technique. In at least one embodiment of the present disclosure, a parallelizable integrity-aware encryption method comprises whitening at least one message block with a first mask value, encrypting the whitened at least one message block using a block cipher and a first key, and whitening the encrypted at least one message block with a second mask value to generate at least one corresponding output ciphertext block. In another embodiment of the present disclosure, a parallelizable integrity-aware encryption method comprises applying a XOR function to all blocks of a message to compute a XOR-sum, applying a first mask value to the XOR-sum; encrypting the masked XOR-sum using a block cipher and a first key, and applying a second mask value to the encrypted XOR-sum to generate an integrity tag.

4 Claims, 7 Drawing Sheets

PARALLELIZABLE INTEGRITY-AWARE ENCRYPTION TECHNIQUE

CROSS-REFERENCE TO RELATED APPLICATIONS

This patent application is a divisional of U.S. patent application Ser. No. 10/772,433, filed Feb. 6, 2004, which is hereby incorporated by reference herein in its entirety.

FIELD OF THE DISCLOSURE

The present disclosure relates generally to cryptography and more particularly to a parallelizable integrity-aware encryption technique.

BACKGROUND OF THE DISCLOSURE

A mode of operation, or mode, for short, is an algorithm that implements a symmetric key block cipher algorithm to provide an information service, such as confidentiality or authentication. With the advent of new block ciphers, such as the Advanced Encryption Standard (AES), there is a need to update long-standing modes of operation and an opportunity to consider the development of new modes such as a combined mode for authentication and confidentiality (commonly referred to as "authenticated encryption" or "integrity-aware encryption").

The notion of a high-speed encryption mode that also provides authentication, i.e., a means for determining the integrity of the encrypted data, has been pervasive in the security industry for the last several years. A plenitude of false-starts in this area had originally been quite discouraging. For example, the National Security Agency (NSA), purportedly the worlds premier cryptographic research organization, had to retract their "Dual Counter Mode" proposal to the National Institute of Standards and Technology (NIST), when fatal security flaws were found in its design. See, for example, Donescu et al., "A Note on NSA's Dual Counter Mode of Encryption," (Aug. 5, 2001), the disclosure of which is incorporated herein by reference in its entirety.

The motivations for a high-speed "integrity-aware" encryption mode is readily apparent—as data links move into the multi-gigabit realm, cryptographic protection functions based on conventional cipher modes cannot be made to run at high data rates, even on custom-built hardware. What is needed then is a mode that is arbitrarily parallelizable, i.e., block cipher operations can be executed in an architecture independent parallel or pipelined manner, thereby allowing throughput to be defined not on the speed of an individual work unit, but on the degree to which parallelism matches the offered load. A mode that is arbitrarily parallelizable implies that the overhead of the confidentiality and authentication mechanisms is incurred only once for the entire plaintext data set regardless of how many processing units are used in parallel.

Conventional techniques to provide both data confidentiality and authentication using only a single processing pass over the plaintext typically employ different variations of the Cipher Block Chaining (CBC) mode of encryption. In CBC mode, the plaintext undergoes an exclusive- or ("XOR" or $\oplus$ in mathematical notation) operation with the previous ciphertext block before it is encrypted. After a plaintext block is encrypted, the resulting ciphertext is also stored in a feedback register. Before the next plaintext block is encrypted, it is XORed with the feedback register to become the next input to the encrypting routine. Therefore, each ciphertext block is dependent not just on the plaintext block that generated it but on all the previous plaintext blocks. Accordingly, CBC encryption is not parallelizable.

A very common approach for making an authentication tag from a block cipher is the cipher block chaining message authentication code (CBC MAC). In a CBC MAC algorithm, a message is partitioned into n-bit blocks. For each input message block, the algorithm enciphers the result of the input with the previous output block. The result of the final enciphering is the authentication tag. Such a technique is not parallelizable as it suffers from its inherent block-to-block serial dependency. It is this serial dependency that frustrates CBC-based attempts to provide multi-gigabit authentication tags at the speed at which an advanced circuit or communications line can transfer information.

United States Patent Application Publication Nos. 2001/0046292 and 2001/0033656 to Gligor et al., the disclosures of which are both incorporated herein by reference in their entirety, present a block encryption mode referred to as eXtended Ciphertext Block Chaining (XCBC) that purportedly provides both data confidentiality and integrity in a parallelizable fashion. See also United States Patent Application Publication No. 2002/0048364 to Gligor et al., the disclosure of which is incorporated herein by reference in its entirety. XCBC employs a single cryptographic primitive and a single processing pass over the input plaintext string by using a non-cryptographic Manipulation Detection Code (MDC) function. Unfortunately, XCBC suffers from the same drawbacks as with CBC MAC, i.e., the inherent serial nature of the block chaining that prohibits architecture-independent parallel and pipelined operation efficiently at the level of individual block processing.

The first apparently correct construction of a block encryption mode that provides both data confidentiality and integrity was the Integrity Aware Parallelizable Mode (IAPM) designed by Jutla. See, for example, United States Patent Application Publication No. 2003/0152219 to Coppersmith et al., the disclosure of which is incorporated herein by reference in its entirety. IAPM relies on a pseudorandom function based on a Gray code, i.e., cyclic binary code, which is applied to the blocks of a message during processing. The overall scheme provides confidentiality and integrity at a small increment to the cost of providing confidentiality alone. Nonetheless, the use of a simple Gray code gives cryptographers a sense of unease about the underlying security.

Rogaway later modified the IAPM construction in what is referred to as an "Offset Codebook" (OCB) mode. See United States Patent Application Publication Nos. 2002/0051537 and 2002/0071552 to Rogaway, the disclosures of which are both incorporated herein by reference in their entirety. OCB retains the principal characteristics of IAPM by employing a parallelizable variable-input-length pseudorandom function constructed out of a Gray code to provide a message authentication code.

In view of the foregoing, it would be desirable to provide a parallelizable integrity-aware encryption technique that overcomes the deficiencies and drawbacks of the prior art.

SUMMARY OF THE DISCLOSURE

According to the present disclosure, a parallelizable integrity-aware encryption technique is provided. In one particular exemplary embodiment, the technique may be realized by/as a method comprising whitening at least one message block with a first mask value, encrypting the whitened at least one message block using a block cipher and a first key, and whitening the encrypted at least one message block with a second mask value to generate at least one corresponding output ciphertext block.

In accordance with other aspects of this particular exemplary embodiment of the present disclosure, the first and second mask values are computed by applying a XOR function to a first value derived from a NONCE value and a second value derived from encrypting a third value using the block cipher and a second key, and then applying a substitution function to the result of the XOR function.

In accordance with further aspects of this particular exemplary embodiment of the present disclosure, the first value derived form the NONCE value is computed by encrypting the NONCE value using the block cipher and the first key.

In accordance with additional aspects of this particular exemplary embodiment of the present disclosure, the third value is a unique counter value or random number.

In accordance with other aspects of this particular exemplary embodiment of the present disclosure, the steps of whitening each comprise the step of applying a XOR function, the first and second mask values being equal.

In accordance with further aspects of this particular exemplary embodiment of the present disclosure, the method further comprises applying a XOR function to all message blocks of a message to compute a XOR-sum, applying a third mask value to the XOR-sum, encrypting the masked XOR-sum using the block cipher and the first key, and applying a fourth mask value to the encrypted XOR-sum to generate an integrity tag.

In accordance with additional aspects of this particular exemplary embodiment of the present disclosure, the third and fourth mask values are computed by applying a XOR function to a first value derived from a NONCE value and a second value derived from encrypting a third value using the block cipher and a second key, and then applying a substitution function to the result of the XOR function.

In accordance with other aspects of this particular exemplary embodiment of the present disclosure, the method further comprises whitening the at least one output ciphertext block with the second mask value, decrypting the at least one whitened ciphertext block using a block cipher and a first key, and whitening the at least one decrypted block with a first mask value to generate at least one corresponding message block.

In accordance with other aspects of this particular exemplary embodiment of the present disclosure, the block cipher is an Advanced Encryption Standard (AES) block cipher, a Data Encryption Standard (DES) block cipher, or a Triple Data Encryption Standard (3DES) block cipher.

In another particular exemplary embodiment, the technique may be realized by/as a method comprising applying a XOR function to all blocks of a message to compute a XOR-sum, applying a first mask value to the XOR-sum, encrypting the masked XOR-sum using a block cipher and a first key, and applying a second mask value to the encrypted XOR-sum to generate an integrity tag.

In accordance with other aspects of this particular exemplary embodiment of the present disclosure, the first and second mask values are computed by applying a XOR function to a first value derived from a NONCE value and a second value derived from encrypting a third value using the block cipher and a second key, and then applying a substitution function to the result of the XOR function.

In accordance with further aspects of this particular exemplary embodiment of the present disclosure, the first value derived form the NONCE value is computed by encrypting the NONCE value using the block cipher and the first key.

In accordance with additional aspects of this particular exemplary embodiment of the present disclosure, the method further comprises whitening at least one message block with a third mask value, encrypting the whitened at least one message block using the block cipher and the first key, and whitening the encrypted at least one message block with the third mask value to generate a corresponding output ciphertext block.

In accordance with additional aspects of this particular exemplary embodiment of the present disclosure, the steps of whitening each comprise the step of applying a XOR function.

In accordance with additional aspects of this particular exemplary embodiment of the present disclosure, the third mask value is computed by applying a XOR function to a first value derived from a NONCE value and a second value derived from encrypting a third value using the block cipher and a second key, and then applying a substitution function to the result of the XOR function.

In accordance with additional aspects of this particular exemplary embodiment of the present disclosure, the block cipher is an Advanced Encryption Standard (AES) block cipher, a Data Encryption Standard (DES) block cipher, or a Triple Data Encryption Standard (3DES) block cipher.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure could be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

FIGS. 1-8 illustrate a method for encrypting data and providing an integrity tag in a parallelizable fashion using a single integrity-aware encryption mode in accordance with at least one embodiment of the present disclosure. The present encryption mode provides the authentication of encrypted messages in a single pass over the data and can detect integrity breaches at minimal cost in system performance. Encryption and generation of an integrity tag can be executed in a parallel or pipeline manner wherein performance is directly dependent on the performance of the underlying block encryption function.

One advantage of the present disclosure is that it provides a stronger pseudo-random function than the simple Gray code used in the IAPM and OCE constructions, thereby providing stronger security over the conventional modes. Moreover, the present integrity-aware encryption mode function is relatively inexpensive to compute and inherently parallelizable.

The following paragraphs describe a process of encrypting and generating an integrity-tag for a message partitioned into n-bit blocks, $B_i$, wherein the indicia "i" specifies the first, second, etc. block of the message. It is important to note that any arbitrary length message can be facilitated. For example, the number of bits less than n not occupied by the message in the last block can be padded with "0" bits, the implementation of which is apparent to one of ordinary skill in the art.

Figure 1:
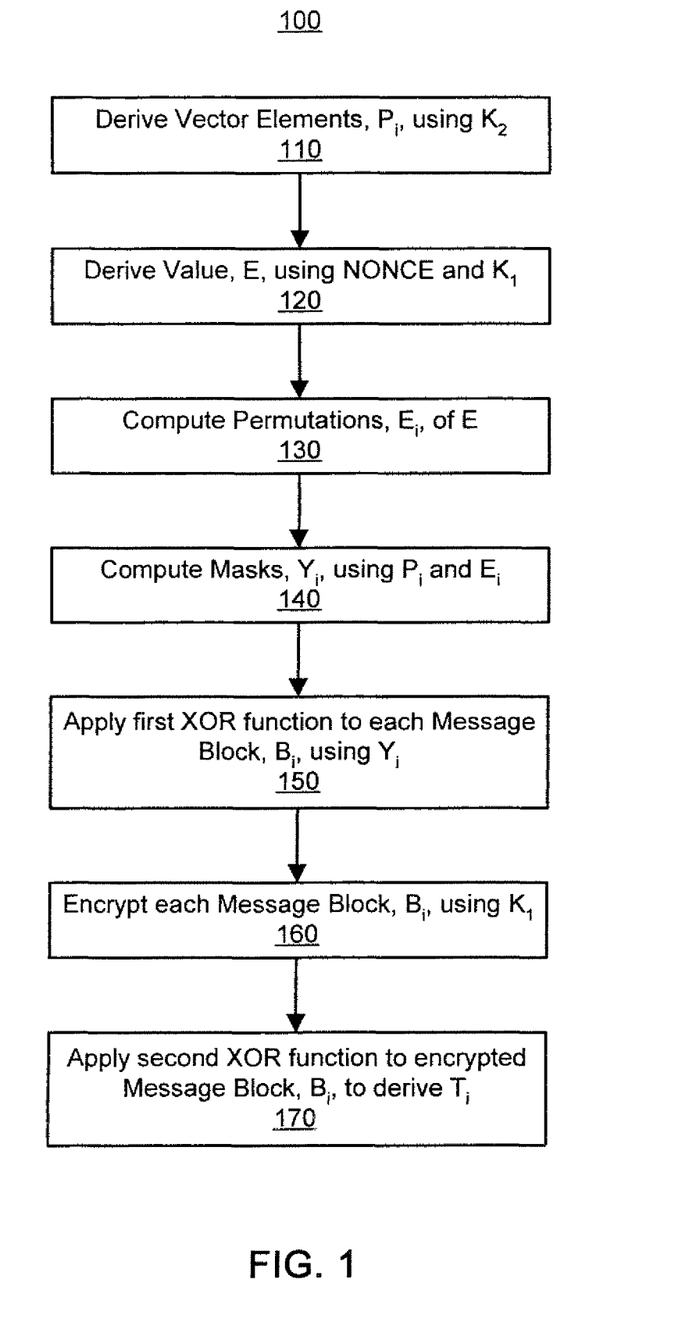
FIG. 1 illustrates a parallelizable integrity-aware encryption method in accordance with at least one embodiment of the present disclosure.

Referring to FIG. 1, there is shown a parallelizable integrity-aware encryption method 100 in accordance with at least one embodiment of the present disclosure. The encryption method 100 employs two (2) keys, referred to as $K_1$ and $K_2$, and an underlying block cipher such as, but not limited to an algorithm based on the Advanced Encryption Standard (AES) or the Data Encryption Standard (DES), the implementation of which is apparent to one of ordinary skill in the art. $K_1$ and $K_2$ can be supplied directly or derived from a master-key using any conventional technique, the identification and implementation of which is apparent to one of ordinary skill in the art. Preferably, the encryption method implements an AES algorithm as the block cipher with a corresponding block of size of 128-bits because of its sophistication and significant performance vis-à-vis previously developed encryption algorithms. Nonetheless, the encryption method 100 can implement other encryption algorithms such as DES or the resource intensive Triple DES (3DES) by specifying an appropriate block size, e.g., 64-bits for DES. The length of keys $K_1$ and $K_2$ are whatever length is appropriate for the underlying block cipher, e.g., 128-256 bits in the case of AES.

Figure 2:
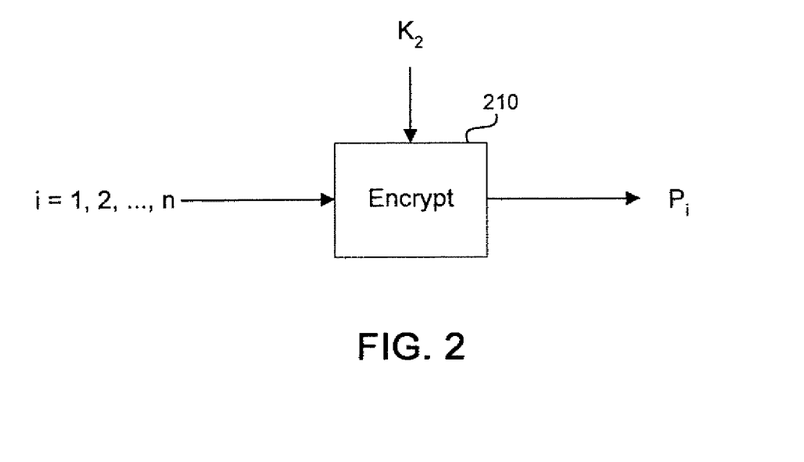
FIG. 2 illustrates a method for computing a vector, P, which is an extension of a cryptographic key, $K_2$, in accordance with at least one embodiment of the present disclosure.

Once keys $K_1$ and $K_2$ are set, the encryption method 100 begins by computing (step 110) a vector "P" using $K_2$, wherein individual elements of the vector are set to a fixed block-size based upon the block cipher implemented with preferably as many elements "n" as are necessary to match the Maximum Transmission Unit (MTU) of a message transmission technology to be ultimately implemented to carry the message to a recipient plus another two elements. As illustrated in FIG. 2, each element, $P_i$, of the vector P is computed by executing an AES block cipher 210 with $K_2$ as the key using a corresponding unique values, $U_i$ (wherein i=1 to n+2). A simple technique that generates a sequence of unique values $U_i$ is to implement an integer counter of a width suitable to the block cipher 210 (e.g., 128-bits/16-bytes in the AES case). Accordingly, if $U_1$ represents the $i^{th}$ counter value, then the $i^{th}$ value of P is computed as follows:

$$P_i = \text{Encrypt}(K_2, U_i), (i=1, 2, \ldots n+2)$$

The vector P will be used in subsequent masking steps and can be thought of as an initialization vector-like value that is computed every time the key $K_2$ is changed. Therefore, P can be thought of as an extension of the key $K_2$.

Figure 3:
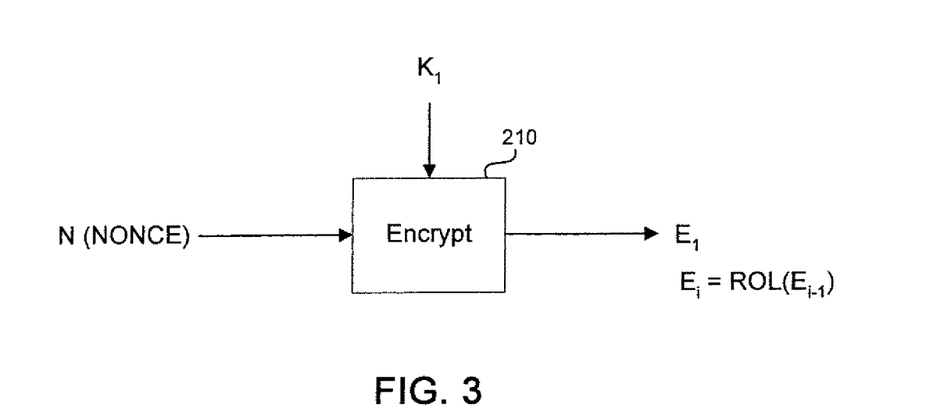
FIG. 3 illustrates a method for computing a value, E, which is an extension of a cryptographic key, $K_1$, based on a NONCE in accordance with at least one embodiment of the present disclosure.

A unique "NONCE" value is employed to derive (step 120) a unique value "E" that will also be used in subsequent masking steps. As the name might suggest, a NONCE is a value used at most once with an associated key. It is very important that this value be non-repeating during the lifetime of a given key, i.e., no NONCE value is used for more than one secure communications session associated with the underlying given key. For decryption, the same NONCE will be used. The NONCE doesn't have to be random or secret or unpredictable, but it does have to be unique per session. For example, the keys $K_1$ and $K_2$ can be distributed by a session-key distribution protocol, the implementation of which is one of ordinary skill in the art. The NONCE should now be unique within that session. Generating new NONCEs is the sender's responsibility as is communicating them to the party that will decrypt the message. An exemplary and suitable scheme would be to set the NONCE, N, to a monotonically-increasing sequence number generated from a counter. Alternatively, a random number may be implemented. Referring to FIG. 3, the value, E, is derived by encrypted N using the block cipher 210 and the key $K_1$. Thus, E is an extension of key $K_1$.

Figure 4:
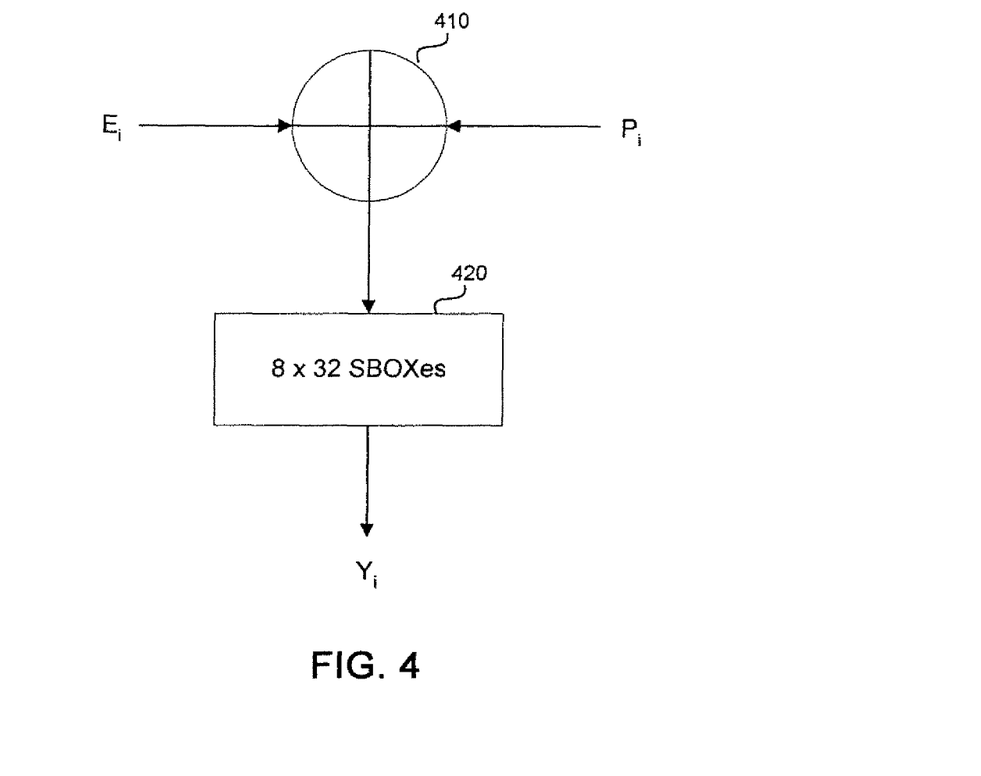
FIG. 4 illustrates a method for computing a mask value, $Y_i$, for every message block, $B_i$, in accordance with at least one embodiment of the present disclosure.

For each block $B_i$, the block will be "whitened" using a mask value derived from $P_i$ and E. However, first the permutations of E are computed (step 130) by, for example, rotating the binary value of E left by one bit for every subsequent permutation. These permutated or rotated values of E are denoted as $E_i$. While this rotation might seem to be serial in nature, the rotation can trivially be parallelized in hardware, the implementation of which is apparent to one of ordinary skill in the art. Referring to FIG. 4, a mask value, $Y_i$, for every message block, $B_i$, is computed (step 140) by operating an exclusive-OR ("XOR") function 410 on $P_i$ and $E_i$, and then performing a non-linear substitution function 420 on the result. Accordingly, $Y_i$ is given as follows:

$$Y_i = \text{SUBST}(P_i \text{ XOR } E_i)$$

The substitution function "SUBST" 420 processes 4-byte chunks (32-bits) of the input data (i.e., $P_i$ XOR $E_i$) and repeatedly substitutes these chunks with one another until the entire input string has been substituted. A "substitution" is the replacement of one bit string with another, preferably in a way that provides nonlinearities between the input and output bit strings. The chunk bytes, designated $C_1$ through $C_4$ below, are used with S-boxes (e.g., from a CAST128 cipher, the implementation of which is apparent to one of ordinary skill in the art, in the example code, but any suitable 8×32 non-linear S-box code will suffice), designated $S_1$ through $S_4$. An "S-box" is a conventional cryptographic primitive that performs a non-linear substitution, the implementation of which is apparent to one of ordinary skill in the art. The resulting value, designated X is therefore computed as follows:

$$X = S_1[C_1] \text{ XOR } S_2[C_2] \text{ XOR } S_3[C_3] \text{ XOR } S_4[C_4]$$

In the case of AES, wherein 128-bit blocks are employed, the substitution function shown above is repeated four (4) times to produce the result.

Figure 5:
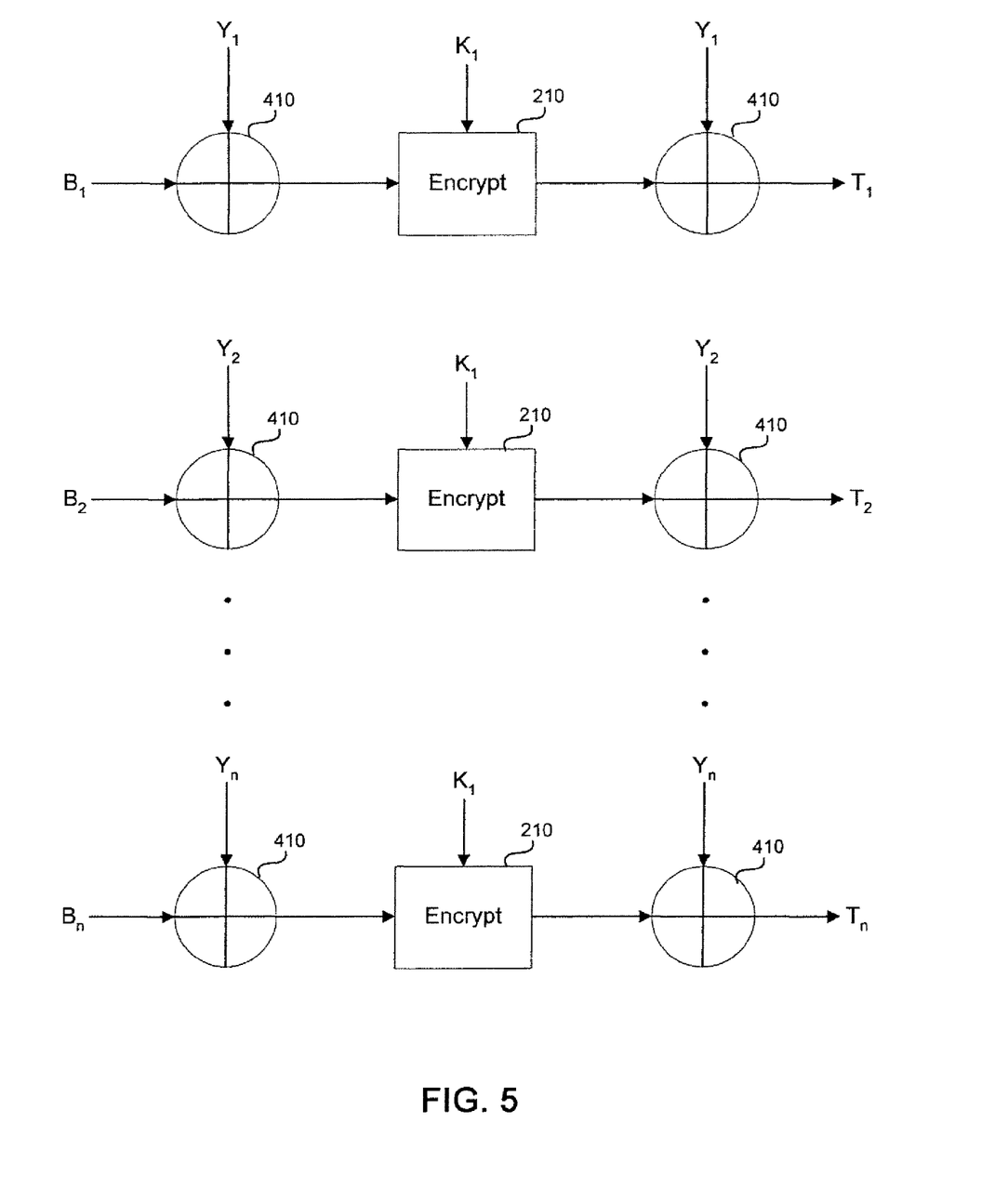
FIG. 5 illustrates a method for computing ciphertext, $T_i$, for each message block, $B_i$, in accordance with at least one embodiment of the present disclosure.

In accordance with at least one embodiment of the present disclosure, the ultimate ciphertext of $B_i$ is computed (steps 150-170) by the computation shown in FIG. 5. Particularly, if the ciphertext output for $B_i$ is designated as $T_i$, then:

$$T_i=[\text{Encrypt}(K_1,B_i \text{XOR} Y_i)] \text{XOR} Y_i$$

Therefore, for each block, a first XOR function 410 is applied (step 150) to $Y_i$, which is the result of the substitution function, and the plaintext block, $B_i$. This result is then encrypted (step 160) using the block cipher 210 and the key $K_1$. A second XOR function 410 is applied to the ciphertext output (i.e., Encrypt ($K_1$, $B_i$ XOR $Y_i$)) of the block cipher 210 and $Y_i$ to give $T_i$. Accordingly, each and every plaintext block, $B_i$, undergoes this computation to yield the ciphertext output, $T_i$, in parallel to one another, thereby providing a fast-encryption technique.

Figure 6:
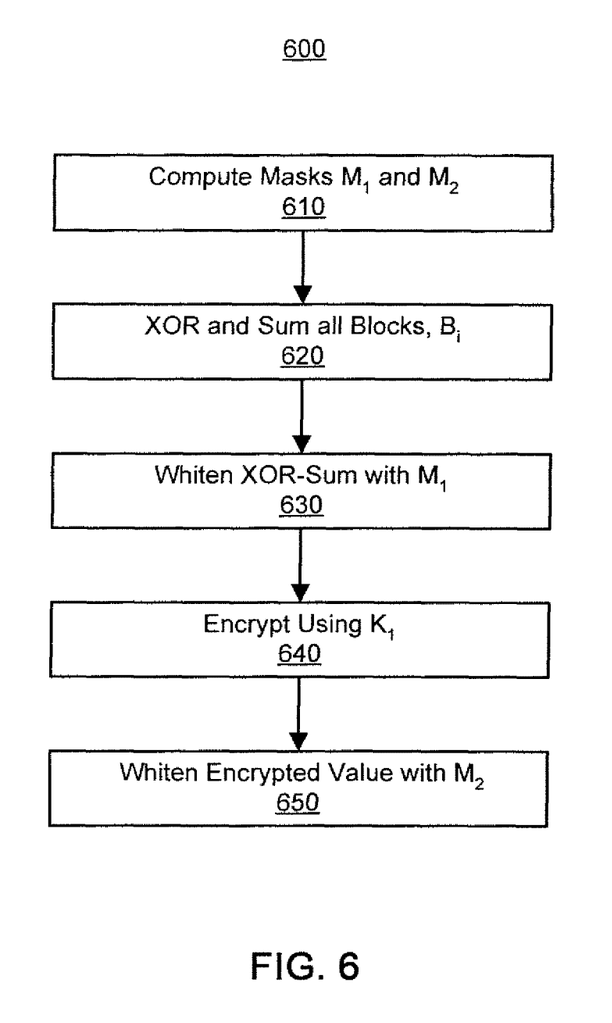
FIG. 6 illustrates a method for computing an integrity tag in accordance with at least one embodiment of the present disclosure.
Figure 7A:
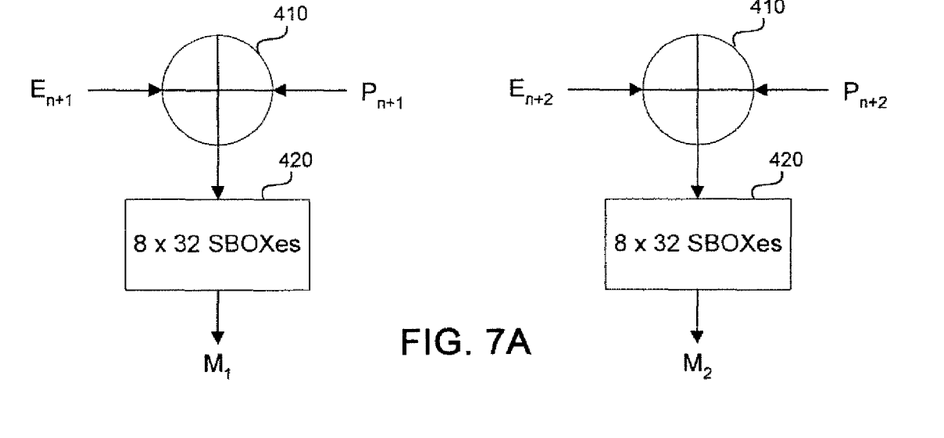
FIGS. 7A-7B illustrate the algorithms for carrying out the method depicted in FIG. 6 in accordance with at least one embodiment of the present disclosure.

In at least one embodiment of the present disclosure, an integrity tag is computed according to a method 600 shown in FIG. 6. Particularly, the method 600 employs two masks $M_1$ and $M_2$ that are computed (step 610) based on the two last blocks of value E and vector P. Referring to FIG. 7A, if n represents the number of plaintext blocks on input, then $M_1$ and $M_2$ are computed by applying a XOR function 410 to the corresponding blocks of E and P and then applying a SUBST function 420 as follows:

$$M_1 = \text{SUBST}(P_{n+1} \text{XOR} E_{n+1})$$

$$M_2 = \text{SUBST}(P_{n+2} \text{XOR} E_{n+2})$$

Figure 7B:
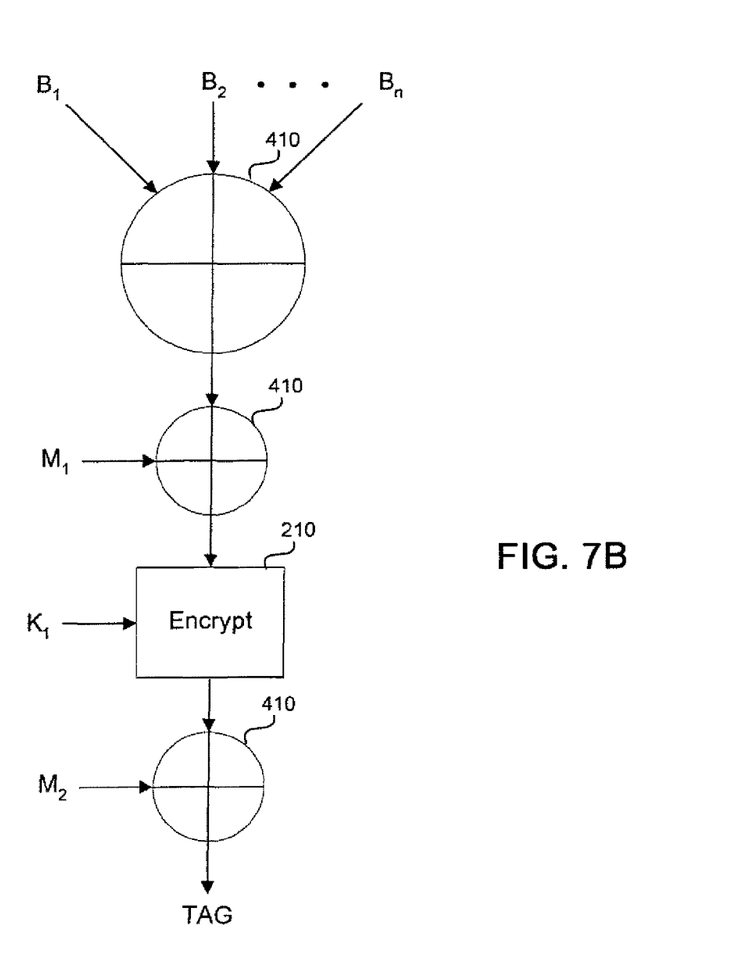

Referring to FIG. 7B, the XOR-sum of all the plaintext blocks, $B_i$, is computed (step 620) by applying the XOR function 410 prior to applying the masks $M_1$ and $M_2$. This result is then whitened (step 630) by applying the XOR function 410 to the first mask $M_1$ and the XOR-sum of all blocks, $B_i$. This result is then encrypted (step 640) under the key $K_1$ using the block cipher 210. The resulting ciphertext is then whitened (step 650) by applying the XOR function 410 with the second mask $M_2$. Thus, the integrity tag "TAG" that results from the application of the method 600 is given as follows:

$$\text{TAG} = \text{Encrypt}[K_1, (\text{XOR-SUM}(B_1, B_2, \ldots B_n) \text{XOR} M_1)] \text{XOR} M_2$$

To decrypt the ciphertext, T, and generate an integrity tag for comparison, the values for $E_i$, $P_i$, $M_1$, $M_2$, and $Y_i$ must be generated at the recipient's end, i.e., the entity performing decryption. To do so, the recipient must have access to the NONCE, which is preferably transmitted confidentially along with the ciphertext, the implementation of which is apparent to one of ordinary skill in the art. This is no different than the initialization vector (IV) being transmitted along with the data for making a CBC mode work. Similarly, P is preferably transmitted to the recipient confidentially. Having possession of the NONCE and P, the recipient can derive $E_i$, $M_1$, $N_2$, and $Y_i$ as specified above.

Figure 8:
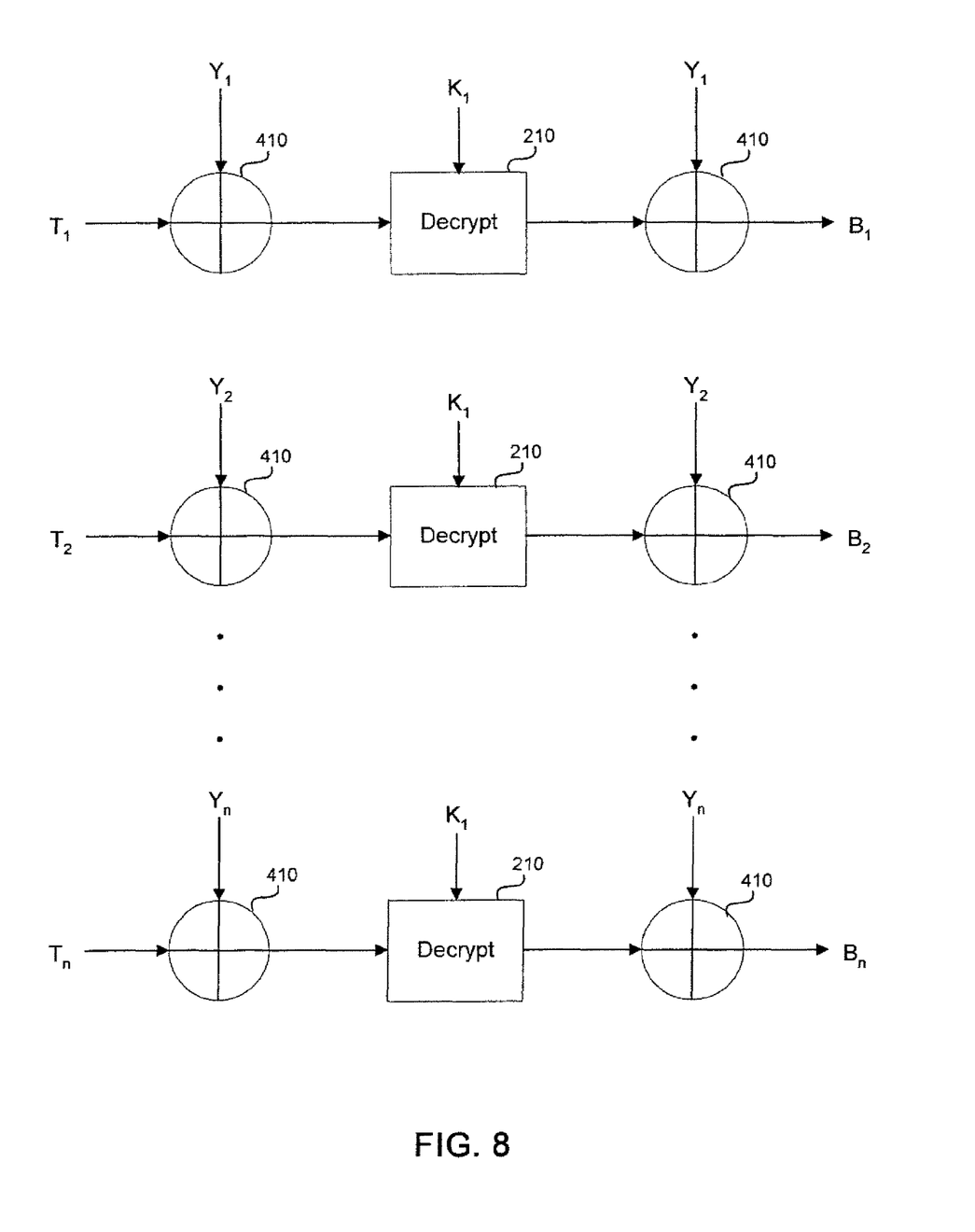
FIG. 8 illustrates a decryption algorithm in accordance with at least one embodiment of the present disclosure.

Referring to FIG. 8, a decryption algorithm is implemented in a parallel manner on the ciphertext blocks, $T_i$, in order to render the plaintext blocks, $B_i$, in accordance with at least one embodiment of the present disclosure. This algorithm is essentially the inverse of the encryption algorithm depicted in FIG. 5 since XORing the same value twice restores the original value. Particularly, the original plaintext blocks, $B_i$, is computed from the ciphertext, $T_i$, as follows:

$$B_i = [\text{Decrypt}(K_1, T_i \text{XOR} Y_i)] \text{XOR} Y_i$$

Therefore, for each block, a first XOR function 410 is applied to $Y_i$ and the ciphertext block, $T_i$. This result is then decrypted using the block cipher 210 and the key $K_1$. A second XOR function 410 is applied to the plaintext output (i.e., Decrypt ($K_1$, $T_i$ XOR $Y_i$)) of the block cipher 210 and $Y_i$ to give $B_i$. As with the encryption process, decryption of the ciphertext blocks $T_i$ can be implemented parallel to one another, thereby providing a fast-decryption technique. It should be noted that AES computes separate encryption and decryption keys for any given input key, the implementation of which is apparent to one of ordinary skill in the art, but such is opaque to this discussion.

Once the plaintext blocks, $B_i$, have been decrypted from the ciphertext, $T_i$, a fresh TAG value can be computed following the process illustrated in FIGS. 6-7B, and compared to the TAG value is associated with the ciphertext message. Computing the integrity function this way still allows the use of truncated tag values, since a fresh tag value is computed on decryption, and only as many bits as appear in the incoming message (subject to local security policy) are compared.

It is easy to see that individual blocks are encrypted/decrypted independently from any other block, and thus the overall encryption/decryption function can be computed in parallel in suitable hardware. The only function that "connects" blocks is the rotation operation that forms values E, which also can be efficiently parallelized in hardware. The main integrity function, which comprises an XOR-sum of the plaintext blocks, $B_i$, can be efficiently computed in hardware quite inexpensively.

At this point it should be noted that the integrity-aware encryption mode in accordance with the present disclosure as described herein involves the processing of input data and the generation of output data. This input data processing and output data generation may be implemented in hardware and/or software. For example, specific electronic components may be employed in an integrated circuit or chipset, or similar or related circuitry for implementing the functions associated with the encryption and integrity processing steps as described below. Alternatively, one or more processors operating in accordance with stored instructions may implement these steps in accordance with the present disclosure as described herein. If such is the case, it is within the scope of the present disclosure that such instructions may be stored on one or more processor readable storage media (e.g., a magnetic disk or other storage medium), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as disclosed herein.

The invention claimed is:

1. A computer implemented parallelizable integrity-aware encryption method, the method comprising:
   applying a XOR function to all blocks of a message to compute a XOR-sum;
   applying a first mask value to the XOR-sum;
   encrypting the masked XOR-sum using a block cipher and a first key;
   applying a second mask value to the encrypted XOR-sum to generate an integrity tag;

whitening at least one message block with a third mask value;

encrypting the at least one whitened message block using the block cipher and the first key; and whitening the at least one encrypted message block with the third mask value to generate a corresponding output ciphertext block, wherein the first mask value is computed by applying a XOR function to a first value derived from a NONCE value and a second value derived from encrypting a third value using the block cipher and a second key, and then applying a substitution function to the result of the XOR function, wherein the second mask value is computed by applying a XOR function to a fourth value derived from the NONCE value and fifth value derived from encrypting a sixth value using the block cipher and the second key, and then applying the substitution function to the result of the XOR function, wherein the first and fourth values derived from the NONCE value are permutations of a binary value computed by encrypting the NONCE value using the block cipher and the first key, wherein the second and fifth values are elements of a vector, and wherein the third mask value is computed by applying a XOR function to a first value derived from a NONCE value and a second value derived from encrypting a third value using the block cipher and a second key, and then applying a substitution function to the result of the XOR function.

2. The method of claim 1, wherein each instance of whitening comprises applying a XOR function.

3. The method of claim 1, wherein the block cipher is selected from the group consisting of: an Advanced Encryption Standard (AES) block cipher, a Data Encryption Standard (DES) block cipher, and a Triple Data Encryption Standard (3DES) block cipher.

4. At least one non-transitory processor readable storage medium storing a computer program of instructions configured to be readable by at least one processor for instructing the at least one processor to execute a computer process for performing the method as recited in claim 1.

* * * * *